Figure 1:
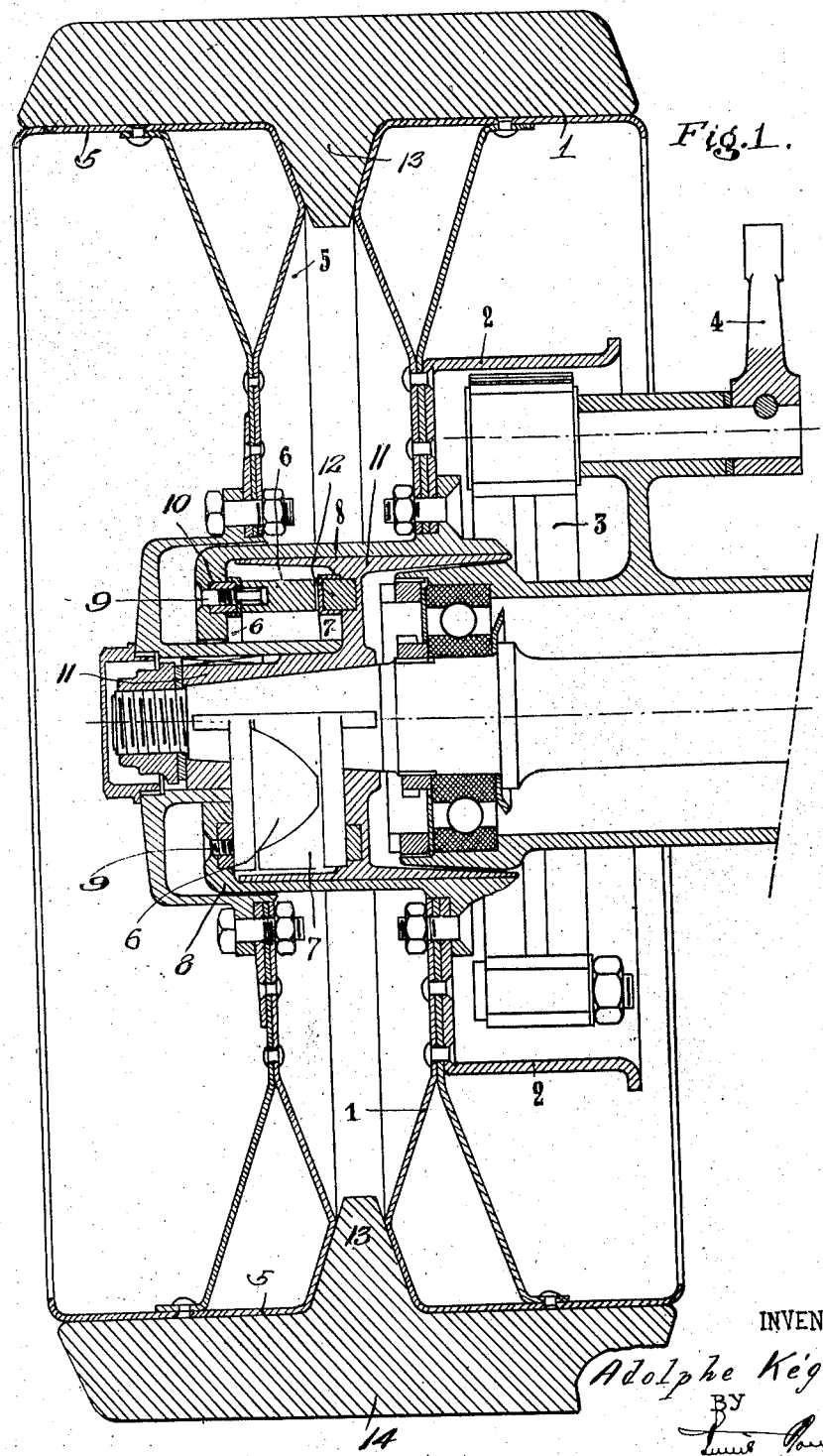

June 9, 1925.

A. KÉGRESSE

BRAKE MECHANISM FOR TRACK BELTS

Filed Jan. 16, 1923

1,540,843

2 Sheets-Sheet 1

INVENTOR:
Adolphe Kégresse
BY
ATTORNEY

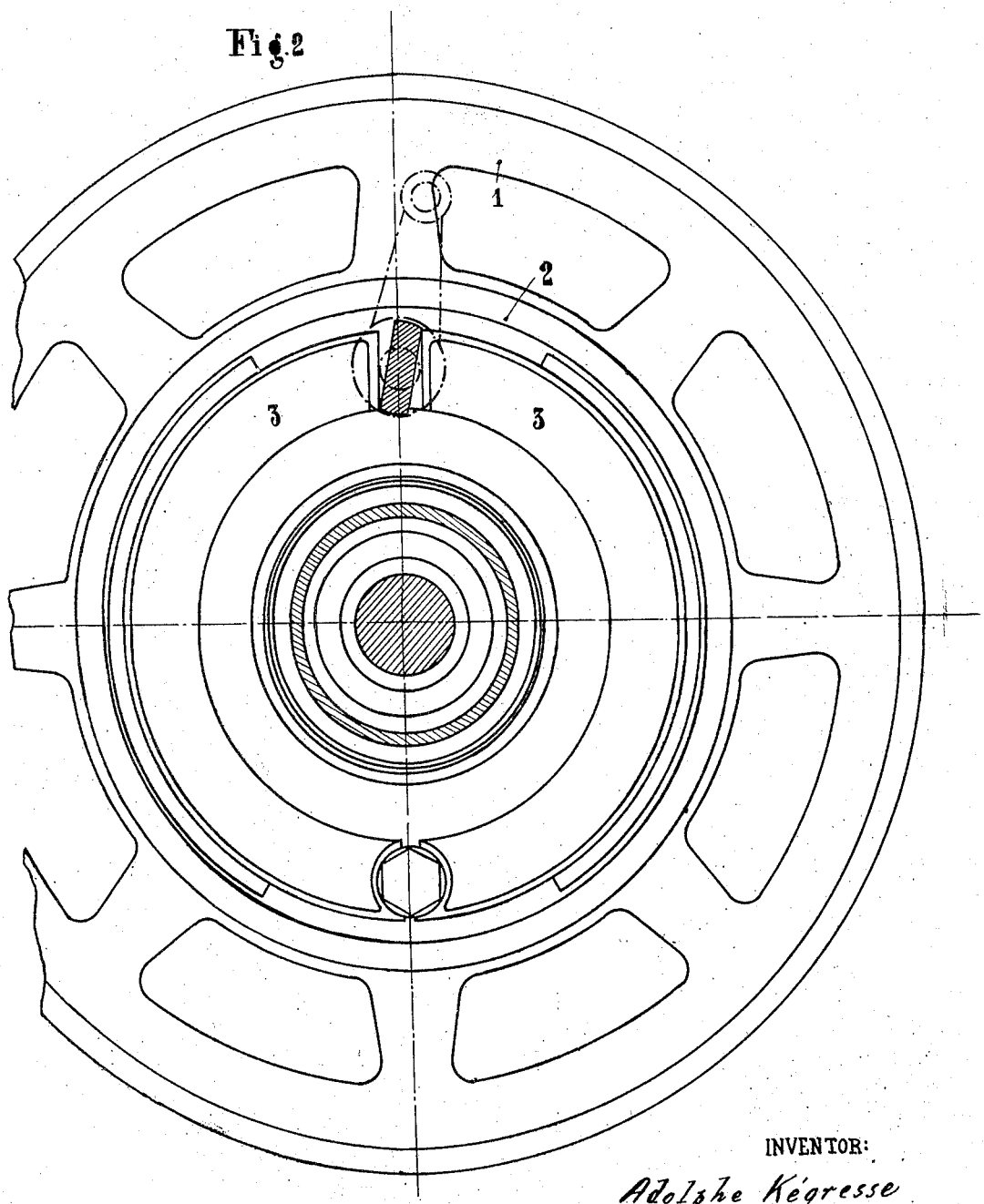

Patented June 9, 1925.

1,540,843

UNITED STATES PATENT OFFICE.

ADOLPHE KÉGRESSE, OF PARIS, FRANCE.

BRAKE MECHANISM FOR TRACK BELTS.

Application filed January 16, 1923. Serial No. 613,031.

*To all whom it may concern:*

Be it known that I, ADOLPHE KÉGRESSE, a citizen of the Republic of France, residing at 53 Rue Balard, Paris, Seine, France, have invented certain new and useful Improvements in Brake Mechanism for Track Belts, of which the following is a specification.

The present invention relates to brake mechanism for track belts, and more particularly to the endless type of belt which is guided internally during its movement and on which a frictional driving action is exerted; the object of the invention being the provision of improved means or devices for effecting braking in such a way as to completely avoid slippage of the belt on the retarding pulley.

An embodiment of the invention is illustrated in the accompanying drawings, wherein Figures 1 and 2 are, respectively, a vertical cross-section and a part-sectional side elevation of the improved brake.

In said drawings, 1 and 5 indicate the two coacting halves or sections of a supporting wheel or pulley for an endless, flexible track belt 14 of the general type shown and described in my Patent No. 1,480,078, granted January 8, 1924; such belts comprising a central, interiorly-located longitudinal projection of trapezoidal section, which may take the form of a single continuous rib, as herein indicated at 13.

The section 1 constitutes the retarding member of the wheel, and on it is mounted the brake drum 2; the latter having disposed within it, as usual, the brake shoes 3 which are caused to bear against its inner surface in the ordinary manner by means of the lever 4. But it will be understood that the brake shoes can be positioned to operate directly upon the wheel section, instead of being disposed within a drum, without altering in any way the essential feature of the invention.

The outer half-wheel or pulley 5 is connected to the inner or retarding section 1 through the intermediary of a device comprising two inclined annular clutch or cam members 6 and 7 which coact with each other and are generally analogous to those illustrated in Figs. 9 and 12 of my aforesaid patent. The member 6 is fixed to the hub 8 of section 1 by means of screws 9 and shearing blocks 10, and the other member 7 is similarly fastened to a hub 11 connected with the section 5, by means of screws (not shown) and shearing blocks 12.

The vehicle being in motion, if the brake is operated, the action of the brake shoes on the drum 2 will tend to slow down the wheel or pulley section 1; but the section 5, which is driven by the belt, will have a tendency to continue its movement. This continued movement tends to rotate the annular member 7 relatively to the member 6, with the result that the coacting inclined surfaces on said members bring the two pulleys closer together, thereby increasing in a perfect manner the gripping action which they conjointly exert upon the interposed belt rib 13.

I claim as my invention:

1. The combination, with a supporting wheel or pulley for an endless, flexible track belt, comprising a pair of spaced, companion sections adapted to grip between them a central longitudinal projection on the inner surface of the belt; of a brake operative on one of said sections to retard its rotation; and a device operative automatically consequent upon the actuation of said brake to effect a relative approaching movement as between said sections and thereby increase the gripping action exerted on the interposed belt projection.

2. The combination, with a supporting wheel or pulley for an endless, flexible track belt, comprising a pair of spaced, companion sections adapted to grip between them a central longitudinal projection on the inner surface of the belt; of a brake operative on one of said sections to retard its rotation; and a device operated automatically by the traction of the belt upon the other section when the brake is actuated, to effect a relative approaching movement as between said sections and thereby increase the gripping action exerted on the interposed belt projection.

3. The combination, with a supporting wheel or pulley for an endless, flexible track belt, comprising a pair of spaced, companion sections adapted to grip between them a central longitudinal projection on the inner surface of the belt; of a brake operative on one of said sections to retard its rotation; and a pair of members, one associated with each section, having coacting inclined surfaces, one of said members being automatically shifted relatively to the other consequent upon the actuation of the brake to force one of the wheel sections toward the other so as to increase the gripping action exerted on the interposed belt projection.

4. The combination, with a supporting wheel or pulley for an endless, flexible track belt, comprising a pair of spaced, companion sections adapted to grip between them a central longitudinal projection on the inner surface of the belt; of a brake operative on one of said sections to retard its rotation; and a pair of members, one associated with each section, having coacting inclined surfaces, one of said members being rotated automatically relatively to the other member by the traction of the belt upon the other wheel section when the brake is actuated, thereby to force one wheel section toward the other so as to increase the gripping action exerted on the interposed belt projection.

In testimony whereof I affix my signature.

ADOLPHE KÉGRESSE.